(12) United States Patent
Wang et al.

(10) Patent No.: US 11,979,619 B2
(45) Date of Patent: May 7, 2024

(54) METHODS, SYSTEMS, AND MEDIA FOR SYNCHRONIZING VIDEO STREAMS

(71) Applicant: Google LLC, Mountain View, CA (US)

(72) Inventors: Jue Wang, San Jose, CA (US); James Sye Jiang Wong, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/802,399

(22) PCT Filed: Apr. 2, 2020

(86) PCT No.: PCT/US2020/026306
§ 371 (c)(1),
(2) Date: Aug. 25, 2022

(87) PCT Pub. No.: WO2021/201868
PCT Pub. Date: Oct. 7, 2021

(65) Prior Publication Data
US 2023/0087174 A1    Mar. 23, 2023

(51) Int. Cl.
*H04N 21/23* (2011.01)
*H04N 21/234* (2011.01)
*H04N 21/235* (2011.01)

(52) U.S. Cl.
CPC ..... *H04N 21/23418* (2013.01); *H04N 21/235* (2013.01)

(58) Field of Classification Search
None
See application file for complete search history.

(56) References Cited

U.S. PATENT DOCUMENTS

| 10,205,970 B2 | 2/2019 | Krahnstoever et al. |
| 2008/0062315 A1 | 3/2008 | Oostveen et al. |

(Continued)

FOREIGN PATENT DOCUMENTS

| JP | 2007528144 A | 10/2007 |
| JP | 2013521674 A | 6/2013 |

(Continued)

OTHER PUBLICATIONS

Examination Report dated Jan. 31, 2023 in IN Patent Application No. 202247060349.

(Continued)

*Primary Examiner* — Cai Y Chen
(74) *Attorney, Agent, or Firm* — Shumaker & Sieffert, P.A.

(57) ABSTRACT

Methods, systems, and media for synchronizing video streams are provided. In some embodiments, the method comprises: identifying a target video stream and a reference video stream, wherein the target video stream and the reference video stream are two different broadcasts of a program; generating, for the target video stream, a sequence of fingerprints; determining a time shift at which the sequence of fingerprints appears within the reference video stream; determining whether the target video stream is synchronized with the reference video stream by determining whether the time shift exceeds a predetermined threshold; and, in response to determining that the target video stream is not synchronized with the reference video stream, causing an electronic programming guide that includes an indication of the target video stream to be modified based on the time shift.

21 Claims, 5 Drawing Sheets

(56) References Cited

U.S. PATENT DOCUMENTS

2014/0289754 A1    9/2014  Riethmueller
2016/0234570 A1    8/2016  Van Deventer et al.
2017/0099515 A1    4/2017  Stokking et al.
2019/0342594 A1*  11/2019  Korte ................. H04N 21/4394

FOREIGN PATENT DOCUMENTS

WO    2005006758 A1    1/2005
WO    2011106601 A2    9/2011

OTHER PUBLICATIONS

International Preliminary Report on Patentability from International Application No. PCT/US2020/026306 dated Sep. 29, 2022, 8 pp.
International Search Report and Written Opinion of International Application No. PCT/US2020/026306 dated Nov. 16, 2020, 10 pp.
Response to First Examination Report dated Jan. 31, 2023, from counterpart Indian Application No. 202247060349 filed Jul. 31, 2023, 5 pp.

* cited by examiner

METHODS, SYSTEMS, AND MEDIA FOR SYNCHRONIZING VIDEO STREAMS

TECHNICAL FIELD

The disclosed subject matter relates to methods, systems, and media for synchronizing video streams.

BACKGROUND

Television networks may broadcast programs to different local stations. For example, a single program may be broadcast to hundreds of local stations across the country. In some cases, a broadcast of a program at a particular location station may become delayed, for example, due to a sports event that goes into overtime, due to a breaking news event, due to a weather delay, etc. In such cases, a local operator at a local station may have to manually detect that the program broadcast is delayed, for example, to manually adjust electronic program guides with corrected timing information. It can be resource-intensive to manually detect program delays and adjust timing information.

Accordingly, it is desirable to provide new methods, systems, and media for synchronizing video streams.

SUMMARY

Methods, systems, and media for synchronizing video streams are provided.

In accordance with some embodiments of the disclosed subject matter, a method for synchronizing video streams is provided, the method comprising: identifying a target video stream and a reference video stream, wherein the target video stream and the reference video stream are two different broadcasts of a program; generating, for the target video stream, a sequence of fingerprints; determining a time shift at which the sequence of fingerprints appears within the reference video stream; determining whether the target video stream is synchronized with the reference video stream by determining whether the time shift exceeds a predetermined threshold; and, in response to determining that the target video stream is not synchronized with the reference video stream, causing an electronic programming guide that includes an indication of the target video stream to be modified based on the time shift. The sequence of fingerprints may, for example, be made up of fingerprints derived from a sequence of frames of the target video stream. A "fingerprint" of a frame of a video stream may, for example, be a compact digital descriptor extracted from the frame. In some embodiments, each fingerprint is derived from a respective frame of the sequence of frames.

In some embodiments, the method further comprises transmitting an alert to an operator associated with the target video stream, wherein the alert indicates the time shift. The alert may, for example, indicate that a time shift has been detected, and optionally may also indicate the length of the time shift.

In some embodiments, the method further comprises determining an error type associated with the time shift.

In some embodiments, the error type indicates that the target video stream did not begin at a correct time.

In some embodiments, the error type indicates that the target video stream will not end at a correct time.

In some embodiments, the target video stream is identified based on metadata associated with the target video stream.

Additionally or alternatively, the reference video stream may be identified based on metadata associated with the reference video stream.

In some embodiments, the method further comprises: identifying a second target video stream; generating, for the second target video stream, a second sequence of fingerprints; determining that the second sequence of fingerprints are not included in the reference video stream; and, in response to determining that the second sequence of fingerprints are not included in the reference video stream, determining that the second target video stream is not a broadcast of the program corresponding to the reference video stream.

In some embodiments, the second target video stream is identified based on metadata associated with the target video stream.

In accordance with some embodiments of the disclosed subject matter, a system for synchronizing video streams is provided, the system comprising a hardware processor that is configured to: identify a target video stream and a reference video stream, wherein the target video stream and the reference video stream are two different broadcasts of a program; generate, for the target video stream, a sequence of fingerprints; determine a time shift at which the sequence of fingerprints appears within the reference video stream; determine whether the target video stream is synchronized with the reference video stream by determining whether the time shift exceeds a predetermined threshold; and, in response to determining that the target video stream is not synchronized with the reference video stream, cause an electronic programming guide that includes an indication of the target video stream to be modified based on the time shift.

In accordance with some embodiments of the disclosed subject matter, a computer-readable medium, which may be non-transitory computer-readable medium, although this embodiment is not limited to a non-transitory computer-readable medium, containing computer executable instructions that, when executed by a processor, cause the processor to perform a method for synchronizing video streams is provided, the method comprising: identifying a target video stream and a reference video stream, wherein the target video stream and the reference video stream are two different broadcasts of a program; generating, for the target video stream, a sequence of fingerprints; determining a time shift at which the sequence of fingerprints appears within the reference video stream; determining whether the target video stream is synchronized with the reference video stream by determining whether the time shift exceeds a predetermined threshold; and, in response to determining that the target video stream is not synchronized with the reference video stream, causing an electronic programming guide that includes an indication of the target video stream to be modified based on the time shift.

In accordance with some embodiments of the disclosed subject matter, a system for synchronizing video streams is provided, the system comprising: means for identifying a target video stream and a reference video stream, wherein the target video stream and the reference video stream are two different broadcasts of a program; means for generating, for the target video stream, a sequence of fingerprints; means for determining a time shift at which the sequence of fingerprints appears within the reference video stream; means for determining whether the target video stream is synchronized with the reference video stream by determining whether the time shift exceeds a predetermined threshold; and means for causing an electronic programming guide that includes an indication of the target video stream to be modified based on the time shift in response to determining that the target video stream is not synchronized with the reference video stream.

In accordance with some embodiments of the disclosed subject matter, a method for synchronizing video streams is provided, the method comprising: identifying a target video stream and a reference video stream, wherein the target video stream and the reference video stream are two different broadcasts of a program; generating, for the target video stream, a sequence of fingerprints; determining a time shift at which the sequence of fingerprints appears within the reference video stream; determining whether the target video stream is synchronized with the reference video stream by determining whether the time shift exceeds a predetermined threshold; and, in response to determining that the target video stream is not synchronized with the reference video stream, transmitting an alert to an operator associated with the target video stream, wherein the alert indicates the time shift.

In accordance with some embodiments of the disclosed subject matter, a method is provided, the method comprising: identifying a target video stream and a reference video stream; generating, for the target video stream, a sequence of fingerprints; determining that the sequence of fingerprints is not included in the reference video stream; and in response to determining that the sequence of fingerprints are not included in the reference video stream, determining that the target video stream is not a broadcast of the program corresponding to the reference video stream.

In accordance with some embodiments of the disclosed subject matter, a computer-readable medium, which may be non-transitory computer-readable medium, although this embodiment is not limited to a non-transitory computer-readable medium, contains computer executable instructions that, when executed by a processor, cause the processor to perform a method according to any embodiment or implementation described herein.

In accordance with some embodiments of the disclosed subject matter, a system for synchronizing video streams is provided, the system comprising a hardware processor that is configured to perform a method according to any embodiment or implementation described herein.

Aspects of the present disclosure thus make it possible to determine whether a target video stream is synchronized with a reference video stream by analysis of a sequence of fingerprints derived from a sequence of frames of the target video sequence. The sequence of frames used to derive the sequence of fingerprints may contain many fewer frames than are included in the target video sequence, and the determination whether the target video stream is synchronized with the reference video stream is therefore computationally efficient. Further, if the sequence of frames used to derive the sequence of fingerprints is selected from frames that occur at an early point in the target video stream, the determination whether the target video stream is synchronized with the reference video stream can be made at an early stage in the transmission of the target video stream. This makes it possible to know at an early stage in the transmission of the target video stream whether the target video stream is synchronized with the reference video stream, thereby enabling an operator, a recipient of the target video stream and/or a device or entity to be notified, before transmission of the target video stream is completed, that the target video stream is not correctly synchronized with the reference video stream.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for synchronizing video streams are provided.

In some embodiments, the mechanisms described herein can determine whether two video streams, each corresponding to a broadcast of a show or program (e.g., a television show, a movie, and/or any other suitable type of show or program) are time-synchronized. For example, in some embodiments, the mechanisms can determine whether a target video stream (e.g., corresponding to an airing of the show on a particular local station) is time-synchronized to a reference video stream corresponding to the same show. In some embodiments, in response to determining that a target video stream is not time-synchronized to a reference video stream, the mechanisms can perform any suitable action(s).

For example, in some embodiments, the mechanisms can generate an alert, which can be transmitted to an operator of a location station presenting the target video stream. As another example, in some embodiments, the mechanisms can cause an electronic programming guide that includes the target video stream to be modified. For example, in an instance in which the mechanisms determine that the target video stream is not synchronized to the reference video stream because the target video stream is delayed relative to the reference video stream, the mechanisms can cause an electronic programming guide to be modified to indicate an accurate starting time of the target video stream, an updated ending time of the target video stream, and/or updated in any other suitable manner.

In some embodiments, the mechanisms can determine whether a target video stream is time-synchronized to a reference video stream using any suitable technique or combination of techniques. For example, in some embodiments, the mechanisms can identify a sequence of fingerprints (e.g., video fingerprints, audio fingerprints, and/or any other suitable fingerprints) of the target video stream. Continuing with this example, in some embodiments, the mechanisms can determine a time shift at which the sequence of fingerprints appear in the reference video stream. Continuing further with this example, in some embodiments, the mechanisms can determine whether the target video stream is synchronized with the reference video stream based on the time shift. As a more particular example, in some embodiments, the mechanisms can determine that the target video stream is synchronized with the reference video stream in response to determining that the time shift is less than a predetermined threshold. Conversely, in some embodiments, the mechanisms can determine that the target video stream is not synchronized with the reference video stream in response to determining that the time shift exceeds a predetermined threshold.

Figure 1:
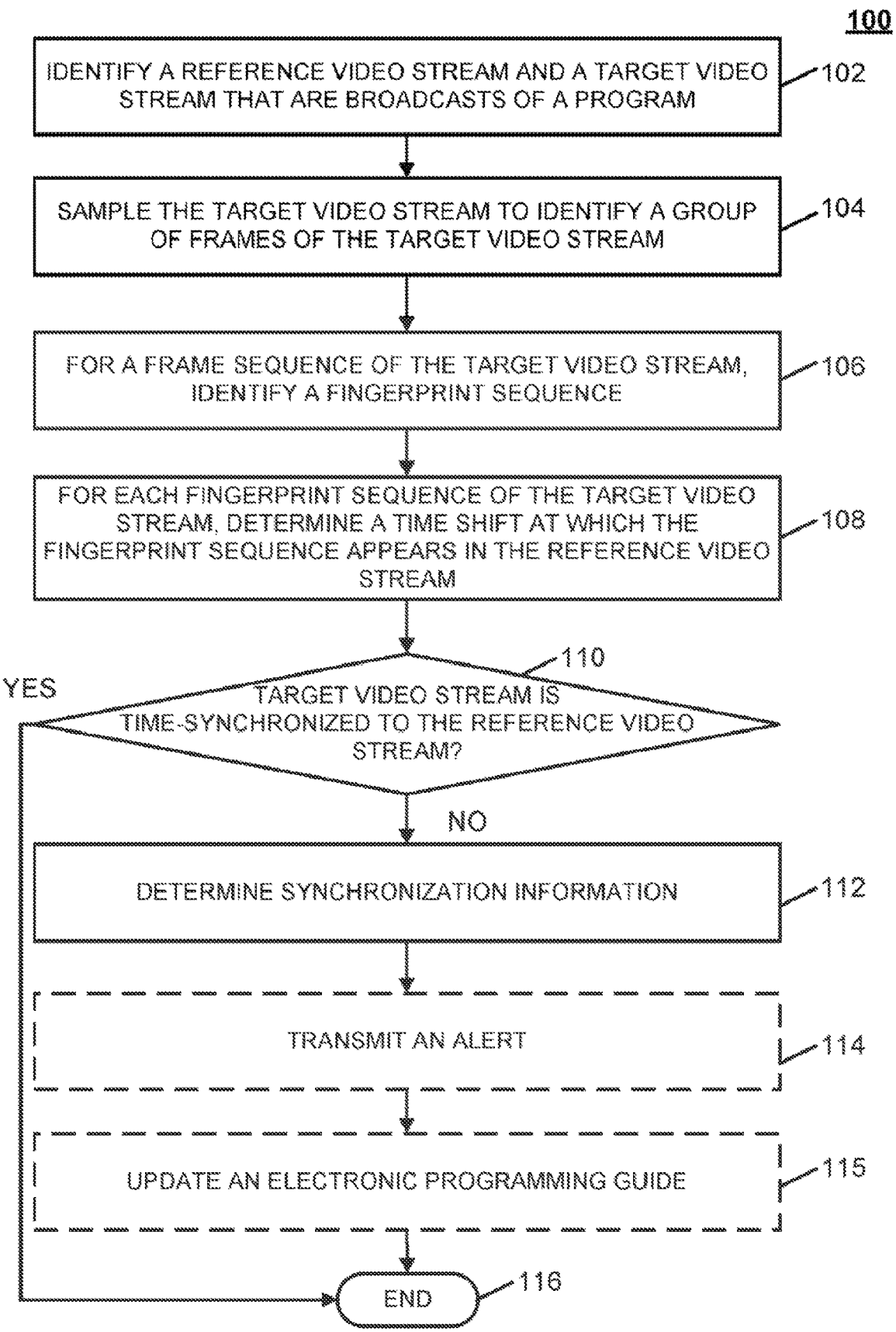
FIG. 1 shows an illustrative example of a process for synchronizing video streams in accordance with some embodiments of the disclosed subject matter.

Turning to FIG. 1, an illustrative example 100 of a process for synchronizing video streams is shown in accordance with some embodiments of the disclosed subject matter. In some embodiments, process 100 can be executed by any suitable device, such as a server that stores different video streams corresponding to airings of a show or program broadcast to different local stations.

At 102, process 100 can begin by identifying a reference video stream and a target video stream that are broadcasts of a program. In some embodiments, process 100 can identify the reference video stream and the target video stream in any suitable manner. Note that, in some embodiments, the reference video stream and the target video stream can each be broadcasts of any suitable type of show or program, such as a television show, a movie, and/or any other suitable type of show. Additionally, in some embodiments, the reference video stream can be any suitable video stream that is to be used as a reference, such as a video stream broadcast to a particular local station, a randomly selected broadcast of the show, and/or any other suitable reference video stream.

In some embodiments, process 100 can identify the reference video stream and/or the target video stream based on metadata associated with each video stream. In some embodiments, the metadata can indicate any suitable information, such as a name of a show or program corresponding to the video stream. For example, in some embodiments, the metadata can indicate a name of a television show, an episode number or name of a particular television show, and/or a name of a movie. In some embodiments, the metadata can indicate any other suitable information, such as a program identifier, an identifier of a channel that the video stream is to be broadcast on, an identifier of a geographic region the video stream is to be broadcast in, a time slot the video stream is to be broadcast in, and/or any other suitable information. In some embodiments, process 100 can identify the target video stream based on metadata that indicates that the target video stream corresponds to the same show or program as the reference video stream.

At 104, process 100 can sample the target video stream to identify a sequence (group) of frames of the target video stream. In some embodiments, process 100 can sample the target video stream at any suitable frequency (e.g., once per second, twice per second, once per two seconds, and/or any other suitable frequency). In some embodiments, process 100 can sample the target video stream at a particular frequency and can identify a frame of the target video stream corresponding to each sampling time point.

At 106, process 100 can, for a frame sequence of the target video stream, identify a fingerprint sequence. In some embodiments, the fingerprint sequence can include any suitable number of video fingerprints of video content corresponding to frames in the frame sequence. Additionally or alternatively, in some embodiments, the fingerprint sequence can include any suitable number of audio fingerprints of audio content corresponding to frames in the frame sequence. In some embodiments, process 100 can identify the fingerprint sequence in any suitable manner. For example, in some embodiments, process 100 can use any suitable video fingerprinting and/or audio fingerprinting algorithm(s) to generate the fingerprint sequence. As another example, in some embodiments, process 100 can retrieve the fingerprint sequence corresponding to the frame sequence from any suitable entity or database. Note that, in some embodiments, the frame sequence can include any suitable number (e.g., one, two, five, ten, twenty, and/or any other suitable number) of frames of the target video stream, and each frame in the frame sequence can be associated with any suitable number of fingerprints (e.g., one fingerprint per frame in the frame sequence, two fingerprints (for example, a video fingerprint and an audio fingerprint, two different video fingerprint representations, etc.) per frame in the frame sequence, and/or any other suitable number of fingerprints). Additionally, note that, in some embodiments, a different number of fingerprints may be identified for different frames. For example, in some embodiments, a first frame in the frame sequence can be associated with two fingerprints of the fingerprints sequence, and a second frame in the frame sequence can be associated with one fingerprint of the fingerprints sequence. Furthermore, in some embodiments, frames in the frame sequence can be a sequence of continuous frames (e.g., $Frame_1$, $Frame_2$, . . . $Frame_N$). Alternatively, in some embodiments, frames in the frame sequence can be non-continuous (e.g., $Frame_1$, $Frame_5$, $Frame_6$, . . . $Frame_N$), where any suitable frames are skipped in the frame sequence.

Figure 2A:
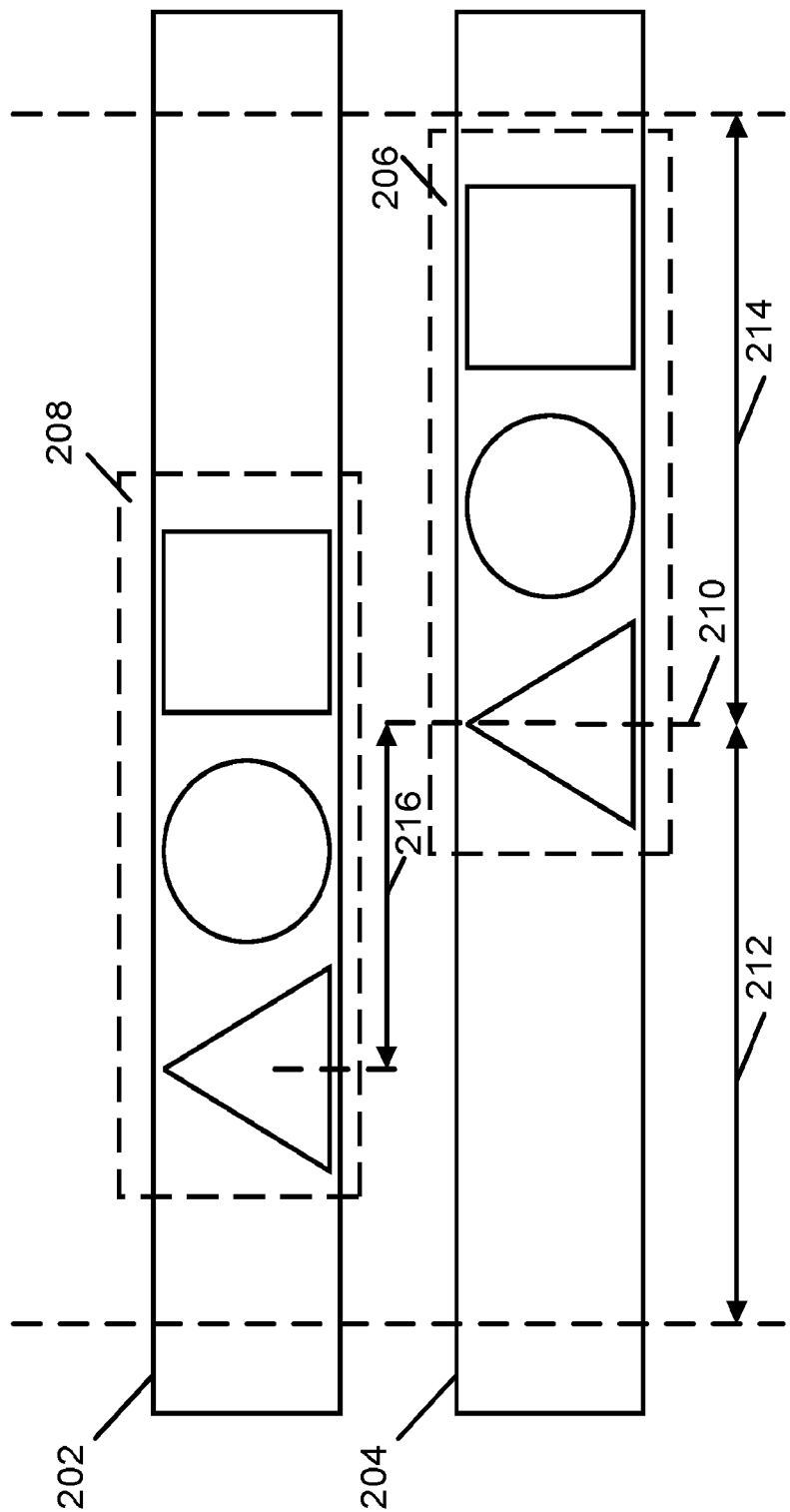
FIG. 2A shows an illustrative example of a schematic diagram for synchronizing video streams in accordance with some embodiments of the disclosed subject matter.

Turning to FIG. 2A, an example of a reference video stream 202 and a target video stream 204 are shown in accordance with some embodiments of the disclosed subject matter. As illustrated, target video stream 204 includes a frame with a fingerprint sequence 206. Note that, although three fingerprints are shown in fingerprint sequence 206, in some embodiments, any suitable number of fingerprints (e.g., one, two, three, five, ten, and/or any other suitable number), and any suitable type of fingerprints (e.g., video fingerprints and/or audio fingerprints) can be included in fingerprint sequence 206. Additionally, note that, in some embodiments, a first fingerprint of fingerprint sequence 206 can be associated with a corresponding checkpoint 210 (which can define a time or point in the sequence at which the fingerprint occurs or a time or point in the sequence at which synchronization is checked).

Referring back to FIG. 1, at 108, for each fingerprint sequence of the target video stream, process 100 can determine a time shift at which the fingerprint sequence appears in the reference video stream. Referring to FIG. 2A, a time shift 216 can indicate a duration of time between checkpoint 210 of fingerprint sequence 206 of target video stream 204 and the corresponding first fingerprint of fingerprints sequence 208 of reference video stream 202.

Referring back to FIG. 1, in some embodiments, process 100 can determine the time shift at which the fingerprint sequence of the target video appears in the reference video stream in any suitable manner. For example, in some embodiments, process 100 can perform a cross-correlation of the fingerprint sequence of the target video stream and the reference video stream to identify the fingerprint sequence within the reference video stream and a time position within the reference video stream at which the fingerprint sequence appears within the reference video stream.

In some embodiments, process 100 can search for the fingerprint sequence of the target video stream within any suitable search window of the reference video stream. For example, referring to FIG. 2A, in some embodiments, process 100 can search reference video stream 202 over a time window 212 that precedes checkpoint 210. As another example, in some embodiments, process 100 can, alternatively or additionally, search reference video stream 202 over a time window 214 that is after checkpoint 210. Note that, in some embodiments, time window 212 and time window 214 can be the same duration. Alternatively, in some embodiments, time window 212 and time window 214 can be of different durations. Note that, in some embodiments, time window 212 and/or time window 214 can each be of any suitable duration (e.g., five seconds, ten seconds, thirty seconds, one minute, five minutes, ten minutes, and/or any other suitable duration).

Note that, in some embodiments, process 100 can determine that the fingerprint sequence of the target video stream does not appear in the reference video stream. In some embodiments, in response to determining that the fingerprint sequence does not appear in the reference video stream, process 100 can determine that the reference video stream corresponds to a different program than the target video stream.

Figure 2B:
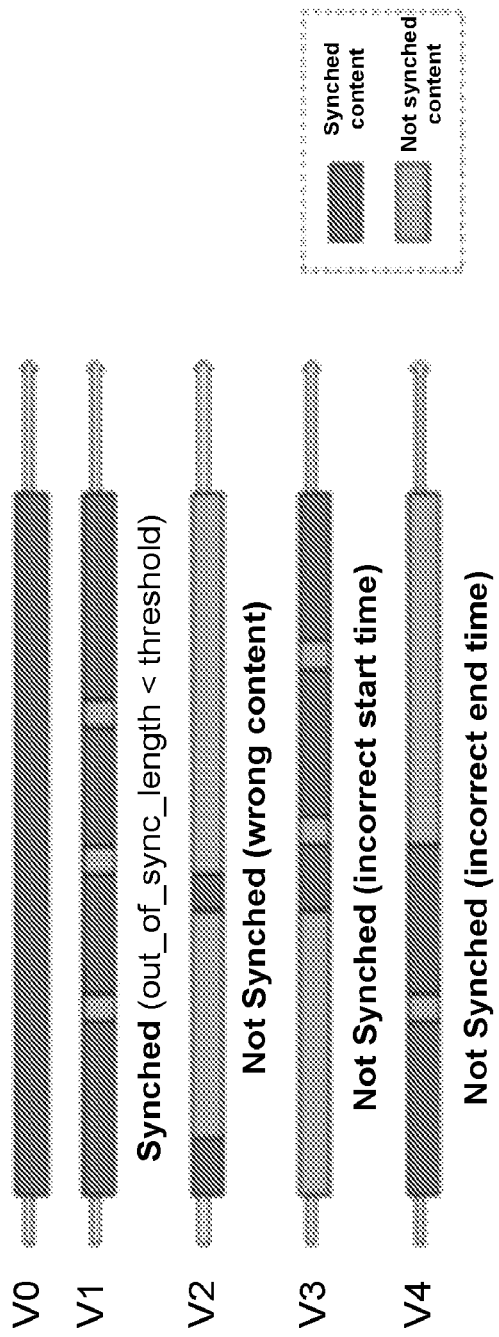
FIG. 2B shows an illustrative example of comparing a target video stream and a reference video stream to determine whether a video stream is deemed to be time synchronized in accordance with some embodiments of the disclosed subject matter.

At 110, process 100 can determine whether the target video stream is time-synchronized to the reference video stream. In some embodiments, process 100 can determine whether the target video stream is time-synchronized to the reference video stream using any suitable technique(s). For example, in some embodiments, process 100 can determine that the target video stream is time-synchronized to the reference video stream in response to determining that the time shift determined at 108 is less than a predetermined threshold duration (e.g., less than five seconds, less than ten seconds, less than one minute, less than two minutes, and/or any other suitable duration of time). In a more particular example, FIG. 2B shows that a target video stream V1 is synchronized with a reference video stream V0 as the out of synchronization length across the target video stream V1 is less than a predetermined threshold. As another example, in some embodiments, process 100 can determine that the target video stream is not time-synchronized to the reference video stream in response to determining that the time shift determined at 108 exceeds the predetermined threshold duration.

Note that, in some embodiments, process 100 can determine that the target video stream is not time-synchronized to the reference video stream in response to determining that the reference video stream does not contain the fingerprint sequence of the target video stream.

If, at 110, process 100 determines that the target video stream is time-synchronized to the reference video stream ("yes" at 110), process 100 can end at 116.

If, at 110, process 100 determines that the target video stream is not time-synchronized to the reference video stream ("no" at 110), process 100 can determine synchronization information at 112. In some embodiments, the synchronization information can include any suitable information, such as an error type associated with the lack of synchronization between the reference video stream and the target video stream.

For example, in some embodiments, in an instance in which process 100 determined that the fingerprint sequence of the target video stream was not found in the reference video stream, process 100 can determine that the error type is that the reference video stream is incorrect content. In a more particular example, as shown in FIG. 2B, in an instance in which process 100 determines that the fingerprint sequence of the target video stream V2 was not found in the reference video stream V0 or that greater than a particular amount of the target video stream V2 was found to not be synchronized with the reference video stream V0, process 100 can determine that the reference video stream V2 is incorrectly identified and a different content item is being provided.

As another example, in an instance in which the fingerprint sequence was found in the reference video stream at a time position preceding the time point at which the fingerprint sequence is found in the target video stream, process 100 can determine that the error type is an incorrect starting time of the target video stream (or, generally, that electronic program guide times associated with the target video stream are incorrect). In a more particular example, as shown in FIG. 2B, in an instance in which process 100 determines that a particular portion of content within target video stream V3 is found to not be synchronized with the reference video stream V0 (e.g., a particular amount of non-synchronized content falls within the beginning portion of target video stream V3), process 100 can determine that the reference video stream has an incorrect start time. In some embodiments, in response to process 100 determining that a particular portion (e.g., 75%) of the non-synchronized content falls within a particular amount of time since the designated start time of a video content item (e.g., the first five minute, the first ten minutes, etc.), process 100 can determine that the target video stream V3 has an incorrect start time. It should be noted that the incorrect start time can be due to, for example, natural event progression where a previous content item was time extended or the existence of an unpredictable condition.

As yet another example, in an instance in which the fingerprint sequence was found in the reference video stream at a time position after the time point at which the fingerprint sequence is found at the target video stream, process 100 can determine that the error type is an incorrect ending time of the target video stream (or, generally, that electronic program guide times associated with the target video stream are incorrect). In a more particular example, as shown in FIG. 2B, in an instance in which process 100 determines that a particular portion of content within target video stream V4 is found to not be synchronized with the reference video stream V0 (e.g., a particular amount of non-synchronized content falls within the ending portion of target video stream V4), process 100 can determine that the reference video stream has an incorrect end time. In some embodiments, in response to process 100 determining that a particular portion (e.g., 75%) of the non-synchronized content falls within a particular amount of time since the designated start time of a video content item (e.g., the last five minute, the last ten minutes, etc.), process 100 can determine that the reference video stream V4 has an incorrect end time.

At 114, process 100 can transmit an alert. In some embodiments, the alert can include any suitable information, such as a duration of the time shift determined at 108, an error type (e.g., such as discussed above in connection with 112), and/or any other suitable information. In some embodiments, process 100 can transmit the alert to any suitable user or entity, such as an operator (e.g., an operator at a local station, and/or any other suitable operator) associated with the target video stream that is not time-synchronized to the reference video stream. In some embodiments, process 100 can transmit the alert in any suitable manner. For example, in some embodiments, process 100 can transmit the alert by transmitting a message to a user account associated with a recipient of the alert. Note that, in some embodiments, block 114 can be omitted. For example, in some embodiments, in an instance in which process 100 updates an electronic programming guide (EPG) directly as described below in connection with block 115, process 114 can be omitted.

At 115, in some embodiments, process 100 can modify an electronic programming guide that includes an indication of the target video stream. For example, in an instance in which process 100 determines that the target video stream is not time-synchronized with the reference video stream because the target video stream is time-shifted by a particular duration (e.g., because the target video stream started later than the reference video stream, and/or for any other suitable reason), process 100 can determine that the electronic programming guide is to be modified to indicate an accurate starting time of the target video stream and/or an updated ending time of the target video stream. As a more particular example, in some embodiments, the electronic programming guide can be modified to indicate an accurate starting time based on the time shift determined at 108 and/or can be modified to indicate an updated ending time based on the time shift determined at 108. Note that, in some embodiments, an electronic programming guide associated with a particular target video stream can be updated automatically without manual input by an operator associated with the particular target video stream.

Additionally, note that, in some embodiments, process 100 can analyze multiple target video streams to determine whether any of the multiple target video streams are not time-synchronized to the reference video stream. For example, in some embodiments, the multiple target video streams can include different broadcasts of a particular show or program. In some embodiments, process 100 can identify a time shift corresponding to each target video stream relative to the reference video stream (e.g., using the techniques described above in connection with 104-108). In some embodiments, process 100 can perform any suitable analysis on the time shifts and/or perform any suitable action(s). For example, in some embodiments, process 100 can transmit an alert to an operator associated with any target video stream associated with a time shift that exceeds a predetermined threshold (e.g., as discussed above in connection with 114).

As another example, in some embodiments, process 100 can cluster the time shifts identified for the multiple target video streams and can identify target video streams associated with outlier time shifts based on the clustering. As a more particular example, in some embodiments, process 100 can cluster any suitable number of time shifts associated with a corresponding number of target video streams (e.g., fifty target video streams, one hundred target video streams, five hundred target video streams, and/or any other suitable number) to identify a subset of the target video streams that are not time-synchronized to the reference video stream. As a specific example, in some embodiments, process 100 can identify a cluster that corresponds to the subset of target video streams that have similar time shifts, and can determine that the cluster represents an outlier of time-synchronization to the reference video stream relative to other target video streams not included in the subset. Continuing with this example, in some embodiments, process 100 can cause any suitable action to be taken in connection with the target video streams in the subset of target video streams, such as causing EPG timing information to be updated, transmitting notifications or alerts to operators associated with each target video stream in the subset of target video streams, and/or performing any other suitable action(s).

Figure 3:
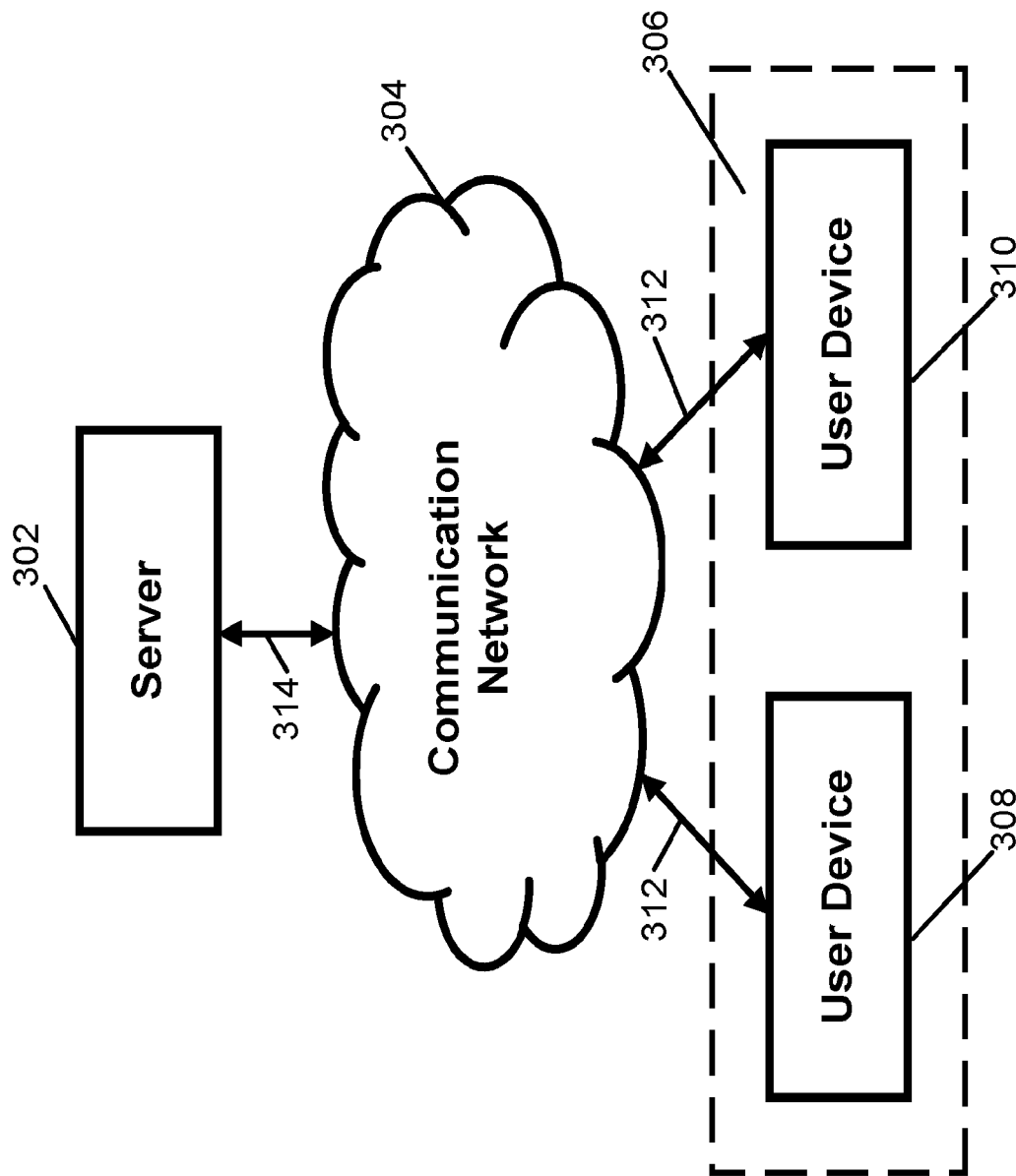
FIG. 3 shows a schematic diagram of an illustrative system suitable for implementation of mechanisms described herein for synchronizing video streams in accordance with some embodiments of the disclosed subject matter.

Turning to FIG. 3, an illustrative example 300 of hardware for synchronizing video streams that can be used in accordance with some embodiments of the disclosed subject matter is shown. As illustrated, hardware 300 can include a server 302, a communication network 304, and/or one or more user devices 306, such as user devices 308 and 310.

Server 302 can be any suitable server(s) for storing information, data, programs, media content, and/or any other suitable content. In some embodiments, server 302 can perform any suitable function(s). For example, in some embodiments, server 302 can detect that a target video stream is not synchronized with a reference video stream, as shown in and described above in connection with FIG. 1. As another example, in some embodiments, server 302 can, in response to determining that a target video stream is not synchronized with a reference video stream, perform any suitable action(s), such as transmitting an alert to an operator or local station associated with the target video stream, causing an electronic programming guide to be modified, and/or performing any other suitable action(s) as shown in and described above in connection with FIG. 1.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for presenting media content. In some embodiments, user device 306 can include any suitable type of user device, such as mobile phones, tablet computers, wearable computers, laptop computers, desktop computers, smart televisions, media players, streaming media players, game consoles, vehicle information and/or entertainment systems, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
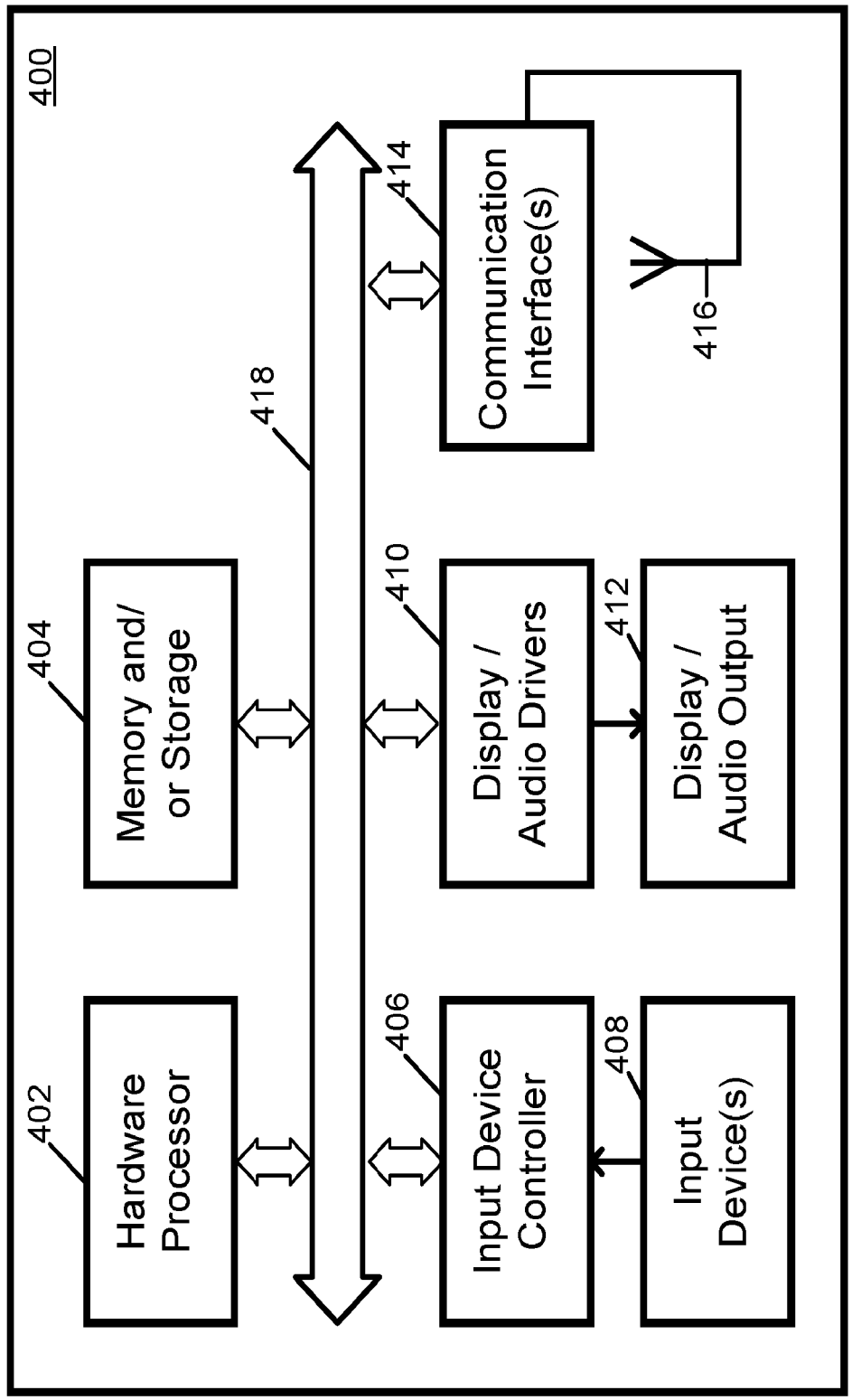
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In situations in which systems and methods described herein collect personal information about users, or may make use of personal information, the users can be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (e.g., such as to a city, ZIP code, or state level), so that a particular location of a user cannot be determined. The user can add, delete, or modify information about the user. Thus, the user can control how information is collected about her and used by a server.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for synchronizing video streams are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for synchronizing video streams, the method comprising:
   identifying a target video stream and a reference video stream, wherein the target video stream and the reference video stream are two different broadcasts of a program;
   generating, for the target video stream, a sequence of fingerprints;
   determining a time shift at which the sequence of fingerprints appears within the reference video stream;
   determining whether the target video stream is synchronized with the reference video stream by determining whether the time shift exceeds a predetermined threshold; and
   in response to determining that the target video stream is not synchronized with the reference video stream, causing an electronic programming guide that includes an indication of the target video stream to be modified based on the time shift.

2. The method of claim 1, further comprising transmitting an alert to an operator associated with the target video stream, wherein the alert indicates the time shift.

3. The method of claim 1, further comprising determining an error type associated with the time shift.

4. The method of claim 3, wherein the error type indicates that the target video stream did not begin at a correct time.

5. The method of claim 3, wherein the error type indicates that the target video stream will not end at a correct time.

6. The method of claim 1, further comprising:
identifying a second target video stream;
generating, for the second target video stream, a second sequence of fingerprints;
determining that the second sequence of fingerprints are not included in the reference video stream; and
in response to determining that the second sequence of fingerprints are not included in the reference video stream, determining that the second target video stream is not a broadcast of the program corresponding to the reference video stream.

7. The method of claim 1, wherein the target video stream is identified based on metadata associated with the target video stream.

8. A system for synchronizing video streams, the system comprising:
a hardware processor that is configured to:
identify a target video stream and a reference video stream, wherein the target video stream and the reference video stream are two different broadcasts of a program;
generate, for the target video stream, a sequence of fingerprints;
determine a time shift at which the sequence of fingerprints appears within the reference video stream;
determine whether the target video stream is synchronized with the reference video stream by determining whether the time shift exceeds a predetermined threshold; and
in response to determining that the target video stream is not synchronized with the reference video stream, cause an electronic programming guide that includes an indication of the target video stream to be modified based on the time shift.

9. The system of claim 8, wherein the hardware processor is further configured to transmit an alert to an operator associated with the target video stream, wherein the alert indicates the time shift.

10. The system of claim 8, wherein the hardware processor is further configured to determine an error type associated with the time shift.

11. The system of claim 10, wherein the error type indicates that the target video stream did not begin at a correct time.

12. The system of claim 10, wherein the error type indicates that the target video stream will not end at a correct time.

13. The system of claim 8, wherein the hardware processor is further configured to:
identify a second target video stream;
generate, for the second target video stream, a second sequence of fingerprints;
determine that the second sequence of fingerprints are not included in the reference video stream; and
in response to determining that the second sequence of fingerprints are not included in the reference video stream, determine that the second target video stream is not a broadcast of the program corresponding to the reference video stream.

14. The system of claim 8, wherein the target video stream is identified based on metadata associated with the target video stream.

15. A non-transitory computer-readable medium containing computer executable instructions that, when executed by a processor, cause the processor to perform a method for synchronizing video streams, the method comprising:
identifying a target video stream and a reference video stream, wherein the target video stream and the reference video stream are two different broadcasts of a program;
generating, for the target video stream, a sequence of fingerprints;
determining a time shift at which the sequence of fingerprints appears within the reference video stream;
determining whether the target video stream is synchronized with the reference video stream by determining whether the time shift exceeds a predetermined threshold; and
in response to determining that the target video stream is not synchronized with the reference video stream, causing an electronic programming guide that includes an indication of the target video stream to be modified based on the time shift.

16. The non-transitory computer-readable medium of claim 15, wherein the method further comprises transmitting an alert to an operator associated with the target video stream, wherein the alert indicates the time shift.

17. The non-transitory computer-readable medium of claim 15, wherein the method further comprises determining an error type associated with the time shift.

18. The non-transitory computer-readable medium of claim 17, wherein the error type indicates that the target video stream did not begin at a correct time.

19. The non-transitory computer-readable medium of claim 17, wherein the error type indicates that the target video stream will not end at a correct time.

20. The non-transitory computer-readable medium of claim 15, wherein the method further comprises:
identifying a second target video stream;
generating, for the second target video stream, a second sequence of fingerprints;
determining that the second sequence of fingerprints are not included in the reference video stream; and
in response to determining that the second sequence of fingerprints are not included in the reference video stream, determining that the second target video stream is not a broadcast of the program corresponding to the reference video stream.

21. The non-transitory computer-readable medium of claim 15, wherein the target video stream is identified based on metadata associated with the target video stream.

* * * * *